INVENTORS
KEIZO UEDA
SATOSHI ANDO
YUSAKU TANAKA
KIYOITI FUJIMARA
ATTORNEYS

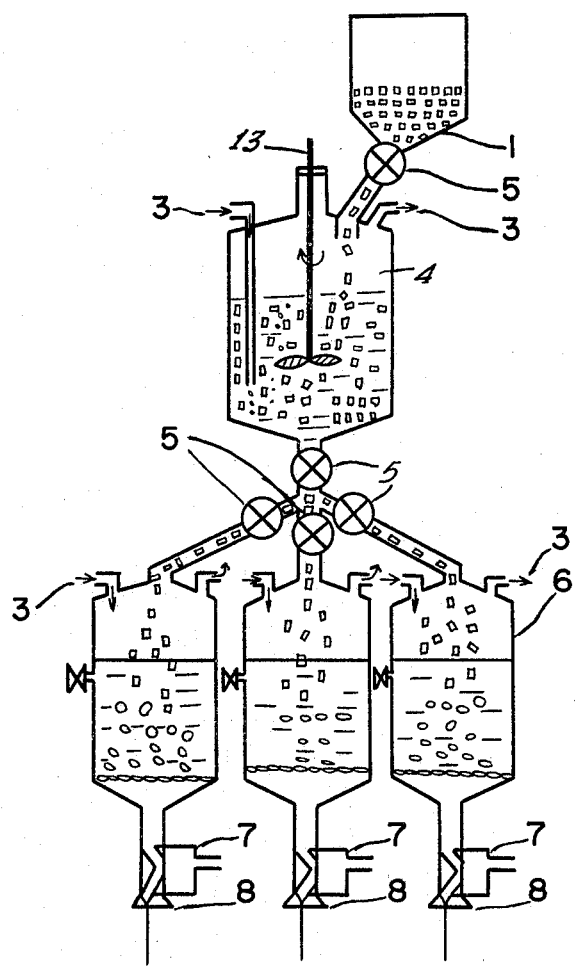
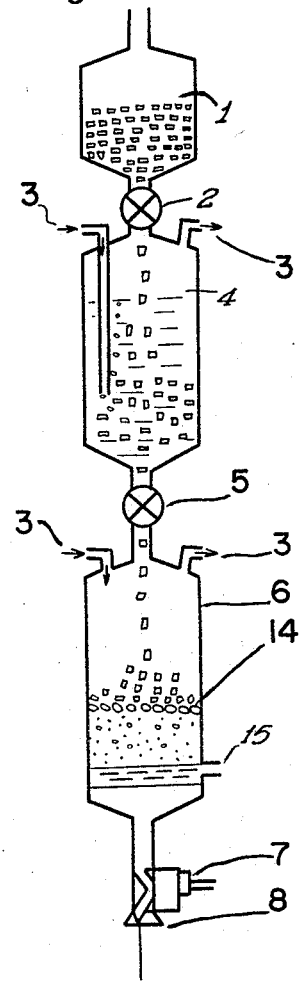
Fig. 2
Fig. 3

United States Patent Office 3,285,592
Patented Nov. 15, 1966

3,285,592
METHOD AND APPARATUS FOR DEHYDRATING AND MELTING THERMOPLASTIC POLYMERS FOR SPINNING OR MOLDING
Keizo Ueda, Nishinomiya-shi, Hyogo-ken, and Satoshi Ando and Yusaku Tanaka, Osaka-shi, and Kiyoiti Fujimura, Ibaragi-shi, Osaka-fu, Japan, assignors to Kanegafuchi Boseki Kabushiki Kaisha, Tokyo, Japan, a corporation of Japan
Filed May 19, 1964, Ser. No. 368,518
Claims priority, application Japan, May 27, 1963, 38/27,420
11 Claims. (Cl. 263—36)

This invention relates to a method and an apparatus for dehydrating and melting thermoplastic polymers for spinning or molding comprising dehydrating and drying fine chips or fine powder particles of a thermoplastic polymer in a liquid heat medium which is neither reactive nor cosoluble with the polymer and then subjecting the polymer to a melting operation.

It has been the general procedure to make in the form of chips a polymer material to be used in making a molded product. A fine powder is also used in some cases. However, if water is present in the raw material polymer, bubbles will be produced during melting of the polymer which will obstruct the spinning, reduce the thread quality, obstruct the molded product operation and mix into the molded product and will thus cause great troubles. Therefore, the polymer to be used must be as dry as possible.

In drying polymers, there has been adopted such procedures as drying them with hot air under a reduced or a normal pressure or heating them with high frequency heat or infrared rays. The polymer dried by such procedures is fed to a melting apparatus so as to be melted and spun or to a molding machine so as to be molded into a molded product. The steps from the drying of the polymer to the molding of the product can be carried out continuously except the drying step. In the drying step, for example, in the case of drying a polyamide under a reduced pressure, it is considered that the only way to dry same is to hold it under a vacuum of 1 mm. Hg for scores of hours. Therefore, the drying step has been considered to interrupt the otherwise completely continuous steps and to greatly obstruct the apparatus and operation.

The principal object of the present invention is to provide an improved method and apparatus for continuously carrying out the steps of dehydrating and drying fine chips or fine powder particles of thermoplastic polymer, melting them and then spinning or molding the melt which procedure employs an improved drying method.

A further substantial object of the present invention is to provide a method and apparatus for continuously dehydrating, drying and melting thermoplastic polymers comprising dehydrating and drying, or dehydrating, drying and melting, fine chips or fine powder particles of a thermoplastic polymer in a liquid heat medium which is neither reactive nor cosoluble with the polymer.

Such objects of the present invention will be made more clear by the following explanation.

According to the method of the present invention, fine chips or fine powder particles of a thermoplastic polymer, from which lower molecular weight substances have been removed by water-washing and on which water has been deposited, can have the water therein removed within a short time by introducing the polymer directly into a liquid heat medium which is neither reactive nor cosoluble with said polymer and which is kept at a temperature below the softening point of the polymer but above the boiling point of water. In the case of such drying, if the temperature of the liquid heat medium is kept at or above the softening point of the fine chips or fine powder particles of the polymer, the water on the surface will be able to be completely removed. But, due to the softening of the surface, the water within the polymer will not be sufficiently volatilized. Therefore, it is not desirable to hold the liquid heat medium at a temperature above the melting point of the polymer in the dehydrating and drying step.

In an embodiment of the method of the present invention, the fine chips or fine powder particles dehydrated as described above are introduced as they are, either continuously or by batches, into another bath containing the same liquid heat medium but heated to a temperature above the melting point of the polymer and the polymer is thereby melted in a bubbleless state. The liquid drops of the thermoplastic polymer in the molten liquid heat medium will collect together due to the specific gravity difference and will form a single molten liquid phase containing no liquid heat medium at all. Therefore, if the polymer melt is extracted out of the molten liquid phase and is spun or molded, it will be possible to obtain fibers or moldings from the fine chips or fine powder particles of the thermoplastic polymer by a perfectly continuous operation.

In another embodiment of the method of the present invention, there is used a melting apparatus having a heating means, such as a grate which is known itself. In such case, too, the liquid heat medium deposited on the dried fine chips or fine powder particles will completely separate from the molten liquid phase in the same manner and therefore fibers or moldings can be produced by a continuous operation in exactly the same manner as in the first embodiment. In each of the above mentioned embodiments there may be used one or more dehydrating and drying apparatus as required for one melting apparatus.

The liquid heat medium to be used in the present invention may be any of such as are neither reactive nor cosoluble with thermoplastic polymers. However, a medium which has a specific gravity lower than that of the polymer to be treated is preferred. Specifically, from the economical or use point of view, silicone oil and spindle oil are especially preferred. The viscosity, temperature and soaking time of the heat medium to be used are determined by the kind, form and water content of the polymer to which the medium is to be applied. Especially, the viscosity of silicone oil can be adjusted so properly and simply that it is very easy to handle. For example, though the viscosity of silicone oil is different depending on the kind of the thermoplastic polymer, it can be freely varied within the preferable range of 100 to 2000 centistokes at 25° C.

The thermoplastic polymers to which the present invention can be applied are individual, polymers, copolymers or mixtures of polymers selected from the group consisting of polyamides, polyethers, polyesters, polycarbonates, polyethylene, polypropylene, polyvinyl chloride and polyvinylidene chloride.

According to the present invention, the steps from the dehydrating and drying to the spinning or molding of the above mentioned polymer can be made continuous by a series of apparatus. As a result, it is possible to simplify the operation, to save the power and personnel costs and to reduce the equipment cost. Further, by these factors, the cost of the final product can be reduced and the quality of the product can be kept uniform.

Now, before describing the examples, apparatus required to carry out the above described method of the present invention shall be explained with reference to the drawings in which:

FIGURES 1(A) and (B) each illustrates an apparatus wherein a dehydrating device and a melting device are provided and are connected so as to carry out both (1) dehydration and drying and (2) melting using a liquid heat medium;

FIGURE 2 illustrates an apparatus which is a modification of the one illustrated in FIGURE 1 and wherein several melting devices are provided and are connected to one dehydrating device;

FIGURE 3 illustrates an apparatus wherein the melting device in the apparatus illustrated in FIGURE 1 is replaced with a melting device having a heating means;

Figure 1A:
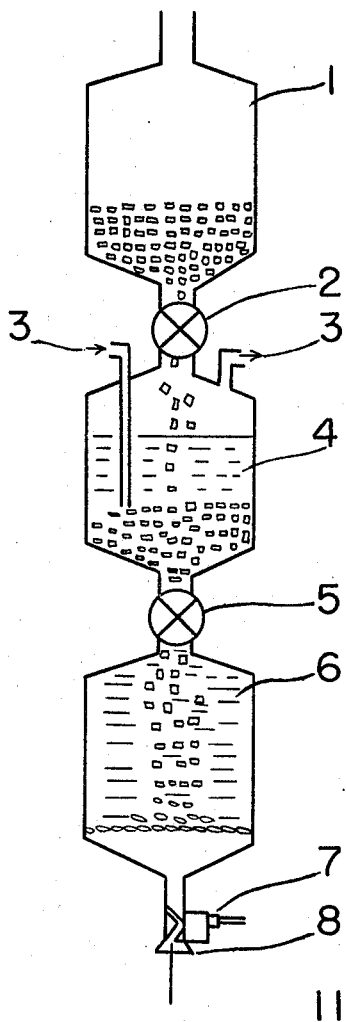

In FIGURE 1(A), 1 is a polymer chip storage tank, 2 is a rotary feeder, 3 is an inert gas exhausting pipe, 4 is a dehydrating device filled wtih silicone oil to dehydrate and dry the polymer, 5 is a valve and 6 is a polymer melting device filled with silicone oil. In using this apparatus, polymer chips, which are not yet dried and contain water, in the storage tank 1 are fed to be dehydrated and dried in the dehydrating device 4. The silicone oil in device 4 is held at a temperature below the softening point of the polymer. The polymer is then fed through the valve 5 into the melting device 6 in which the silicone oil is kept at the melt-spinning temperature of the polymer and the molten polymer is spun through a nozzle 8 by means of a gear pump 7.

In FIGURE 1(B), 1 to 8 are the same as in FIGURE 1(A), 9 is a dehydrating device having in its lower part small holes so that polymer chips or flakes will not pass therethrough. 10 is a silicone oil circulating pipe, 11 is a silicone oil circulating pump and 12 is a pipe having small holes for injecting the silicone oil into the polymer. In using this apparatus, polymer chips which are not yet dried are fed into the dehydrating device 9 by means of the rotary feeder 2 and silicone oil kept at a temperature below the softening point of the polymer is circulated by means of the pump 11 and is injected from the pipe 12 into the polymer to dehydrate the chips. When the polymer chips or flakes thus arrive at the lower part of the dehydrating device, they will have been completely dehydrated. They are then fed into the melting device 6 in which the silicone oil is kept at the spinning temperature and are melted. The melt is then spun through the gear pump 7 and nozzle 8.

Thus the polymer can be continuously dried, dehydrated and melt-spun. Needless to say, the silicone oil can be circulated through the polymer which is held stationary in order to dry and dehydrate the polymer.

Illustrated in FIGURE 2 is a dehydrating and melting apparatus of a batch system wherein several polymer melting devices 6 are arranged in parallel, 13 is a stirrer, 3 is an inert gas exhausting pipe, 4 is a dehydrating device to dehydrate and dry the polymer, 5 is a valve, 6 is a polymer melting device, 7 is a gear pump and 8 is a nozzle.

In this apparatus, a polymer which is not yet dried is fed into the dehydrating device 4 in which the liquid is kept at a temperature below the softening point of said polymer, is stirred by means of the stirrer 13, dehydrated and dried and is then fed through the valves 5 into the melting devices 6 in which the liquid is kept at the melting point of the polymer and the molten polymer is spun through the gear pump 7 and nozzle 8.

In the apparatus illustrated in FIGURE 3, 1 to 5 are the same as in FIGURE 1(A) but the melting device 6 has a grate 14, 7 is a gear pump, 8 is a nozzle and 15 is a silicone oil draining pipe.

In using this apparatus, polymer chips which are not yet dried are fed from the storage tank 1 through the rotary feeder 2 into the dehydrating device 4 in which the liquid is kept at a temperature below the softening point of the polymer. The thus dried polymer is dropped onto the grate 14 in the melting device 6 and the thus molten polymer is spun through the gear pump 7 and nozzle 8. In melting the polymer on the grate, the silicone oil deposited on the polymer is separated and is drained through the pipe 15.

Films, bars, pipes or any other moldings can be produced instead of filaments by changing the nozzle part. For example, an extruding machine or an injection molding machine having a proper capacity may be used in place of the gear pump and nozzle in FIGURES 1 to 3.

Further, any other suitable conveying device can be used in place of the valve in the connecting part to the dehydrating and drying device. In order to quickly and uniformly remove bubbles in the dehydrating and drying step, there can be used a vertical or horizontal stirring device for the liquid medium, such as a stirrer, turbine, propeller, screw vane or ejector type or the device shown in FIGURE 2 for circulating and stirring the liquid medium with the polymer which can be either stationary or moving.

Further, if required, to minimize coloring by oxidation with removed air and oxygen, the dehydrating and drying step may be carried out while blowing in an inert gas, such as nitrogen or carbon dioxide, to more advantageously carry out the method of the present invention.

Further, the apparatus of the present invention is not limited to those illustrated in FIGURES 1(A) and (B), 2 and 3 but it is possible to use many kinds of apparatus replaced or modified by using the principle of the present invention.

The method of the present invention shall be explained with reference to the following examples:

Example 1

Figure 4:
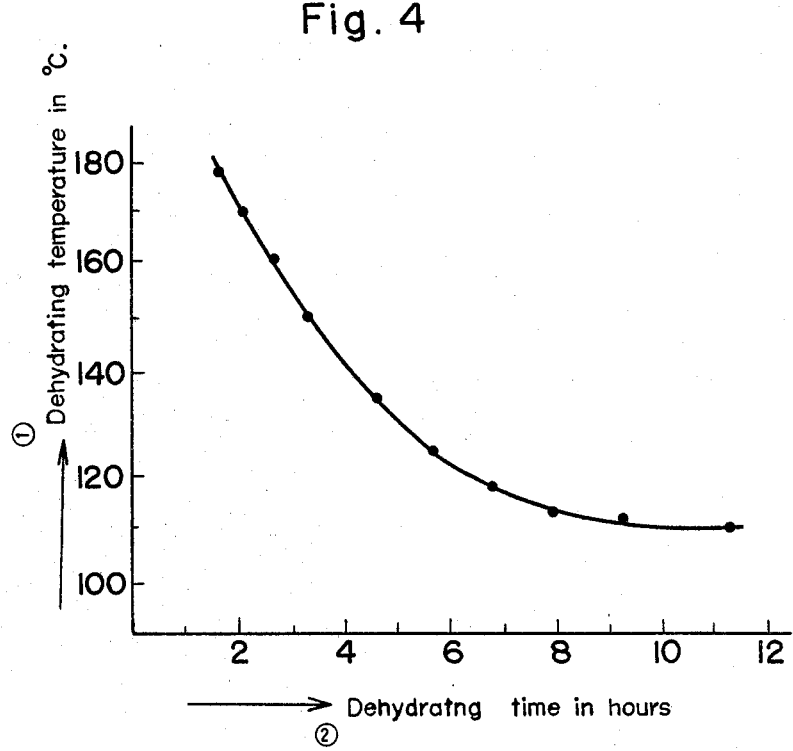
FIGURE 4 is a graph showing the relation between the dehydrating temperature and dehydrating time in the step of dehydrating and drying caprolactam chips using the apparatus according to the invention.

Polycapramide in the form of chips containing 30% water was soaked in silicon oil having a viscosity of 300 centistokes at 20° C. at varying temperatures and times, was stirred and dried, was then melted in silicone oil at 270° C. and was spun. The relation between the drying time and temperature until the spinnable moisture was reached was as shown in FIGURE 4.

First of all, using the apparatus illustrated in FIGURE 1(A), polycapramide chips 3 mm. long and containing 30% water were put into the storage tank and 100 g. of polycapramide per minute were introduced into the dehydrating device by means of the rotary feeder 2, 200 cc. of dry nitrogen gas per minute were passed through the dehydrating device while keeping at 160° C. silicone oil having a viscosity of 300 centistokes at 25° C.

In 3 hours, about 70 g. of the dried chips per minute were begun to be introduced into the melting device by starting the rotation of the rotary feeder 5. The melting device had been filled with silicone oil kept at 260° C. When the gear pump 7 was then rotated, polycapramide fibers were continuously spun through the nozzle 8.

The obtained fibers were wound up at a velocity of 800 m. per minute. The polycapramide fibers obtained in the elongating and twisting step by the normal process were highly uniform filaments of a strength of 8 g./d. and an elongation of 24%.

Example 2

Polycapramide in the form of chips containing 30% water after being washed with warm water was soaked at 150° C. for 3 hours in silicone oil having a viscosity of 300 centistokes, was dried, was then melted in silicone oil at 250° C. and was extruded through a T-die by means of a gear pump. Thus polycapramide sheets could be obtained continuously. The sheet obtained by this method was not inferior to the one obtained by any conventional method in respect of the strength, transparency and other qualities. Thus more uniform sheets were obtained.

Example 3

Using the apparatus illustrated in FIGURE 2, polyhexamethylene adipamide chips 3 mm. long and containing 30% water were introduced at a rate of 300 g. per minute into the dehydrating device 4 from the storage tank 1 and silicone oil having a viscosity of 300 centistokes at 25° C. was kept at 130° C. while rotating the stirrer 13 at 30 r.p.m. In 4 hours, the valves 5 were begun to be operated to introduce about 70 g. of the dried chips into each of the three melting devices 6. In the melting device, silicone oil was kept at 280° C. while passing 50 cc. of nitrogen gas per minute through the device. In 15 minutes after the beginning of the introduction of the dried chips, the rotation of the gear pump 7 was started and thus polyhexamethylene adipamide fibers could be continuously spun through the nozzle.

*Example 4*

Using the apparatus illustrated in FIGURE 3, polycarbonate in the form of chips containing 10% water was put into the storage tank 1, was soaked in silicone oil of a viscosity of 1000 centistokes at 25° C., was kept at 150° C. for 90 minutes, was dehydrated and dried, was melted in the melting device 6 of a grate type heated to 290 to 300° C. and was continuously spun. Thus uniform filaments of a strength of 6 g./d. and an elongation of 19% were obtained.

*Example 5*

Figure 1B:
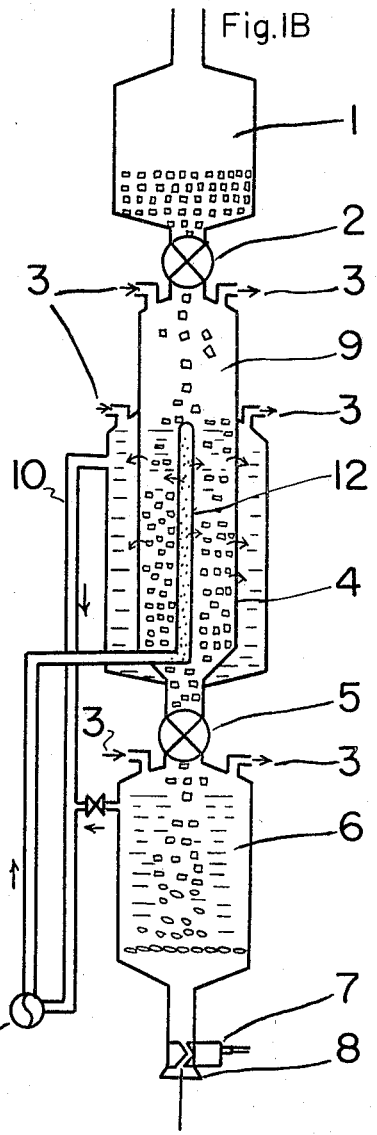

Using the apparatus illustrated in FIGURE 1(B), polyethylene terephthalate in the form of chips containing 10% water was soaked at 180° C. for 90 minutes while circulating silicone oil having a viscosity of 300 centistokes by means of the pump 11, was dehydrated and dried, was then melted in the melting device 6 filled with silicone oil at 270° C. and was continuously spun. Thus uniform filaments of a strength of 6 g./d. and an elongation of 28% were obtained.

What is claimed is:

1. A method of dehydrating and melting thermoplastic polymers having a softening point higher than the boiling point of water, which comprises:
    placing solid particles of a thermoplastic polymer containing water in a body of a liquid which is inert to and insoluble with the polymer, said polymer having a softening point higher than the boiling point of water, maintaining said liquid at a temperature below the softening point of the polymer but above the boiling point of water so that the water will be vaporized and the polymer will be in an unsoftened condition;
    removing the vaporized water from the polymer and the liquid; and
    then melting the polymer and subjecting it to a molding operation.

2. A method of dehydrating, melting and molding thermoplastic polymers according to claim 1, in which the melting of the polymer is carried out by placing the water-free polymer in a liquid which is inert and insoluble with the polymer and which is maintained at a temperature above the melting point of the polymer.

3. A method of dehydrating, melting and molding thermoplastic polymers according to claim 1, in which the melting of the polymer is carried out by placing the water-free polymer on a grate and heating the polymer above its melting point while it is so supported on the grate.

4. A method of dehydrating, melting and molding thermoplastic polymers, according to claim 1, in which the polymer is selected from the group consisting of individual polymers, copolymers and mixtures of polyamides, polyethers, polycarbonates, polyethylene, polypropylene, polyvinyl chloride, and polyvinylidene chloride.

5. A method of dehydrating, melting and molding thermoplastic polymers, according to claim 1, in which the liquid has a viscosity of from 100 to 2,000 centistokes at 25° C.

6. A method of dehydrating, melting and molding thermoplastic polymers, according to claim 5, in which the liquid is selected from the group consisting of silicone oil and spindle oil.

7. A method of dehydrating, melting and molding thermoplastic polymers, which comprises:
    continuously feeding solid particles of a thermoplastic polymer containing water into a body of a liquid in a substantially closed container, said liquid being inert and insoluble with the polymer and said polymer having a softening point higher than the boiling point of water, maintaining said liquid at a temperature below the softening point of the polymer but above the boiling point of water so that the water will be vaporized and the polymer will remain in an unsoftened condition;
    continuously removing the vaporized water from the container;
    continuously removing the dehydrated unsoftened particles of the thermoplastic polymer from the container and feeding the same to a melting device; and
    melting the polymer and then subjecting it to a molding operation.

8. An apparatus for dehydrating and melting thermoplastic polymers having a softening point higher than the boiling point of water, comprising:
    supply means for holding a supply of particulate polymer material;
    a vessel containing a liquid which is inert to and insoluble with the polymer, said liquid being at a temperature below the softening point of the polymer but above the boiling point of water, said vessel having a feed opening connected to said supply means and also having a discharge opening;
    means to remove vaporized water from said vessel;
    a melting device and valve means for selectively connecting said melting device to said discharge opening of said vessel.

9. An apparatus according to claim 8, in which the melting device comprises a second vessel containing a liquid which is inert to and insoluble with the polymer, said liquid being at a temperature higher than the melting point of the thermoplastic polymer.

10. An apparatus according to claim 8, in which the melting device is a container having a melting heater within it and a port for draining the liquid which accompanies the dehydrated and dried thermoplastic polymer entering from the vessel.

11. An apparatus according to claim 8, in which a plurality of melting devices are alternatively and selectively connectible to the vessel.

References Cited by the Examiner

UNITED STATES PATENTS

| | | | |
|---|---|---|---|
| 2,289,774 | 7/1942 | Graves | 18—8 X |
| 2,295,942 | 9/1942 | Fields | 18—8 X |
| 2,437,685 | 3/1948 | Dreyfus | 264—176 |
| 2,437,704 | 3/1948 | Moncrieff et al. | 18—8 X |
| 2,658,743 | 11/1953 | Speil et al. | 263—10 |

FOREIGN PATENTS 925,323    9/1947    France.

FREDERICK L. MATTESON, JR., *Primary Examiner.*

JOHN J. CAMBY, *Examiner.*

D. A. TAMBURRO, *Assistant Examiner.*